April 22, 1930.  K. AHMELS ET AL  1,755,759
POCKET MICROSCOPE
Filed June 30, 1928
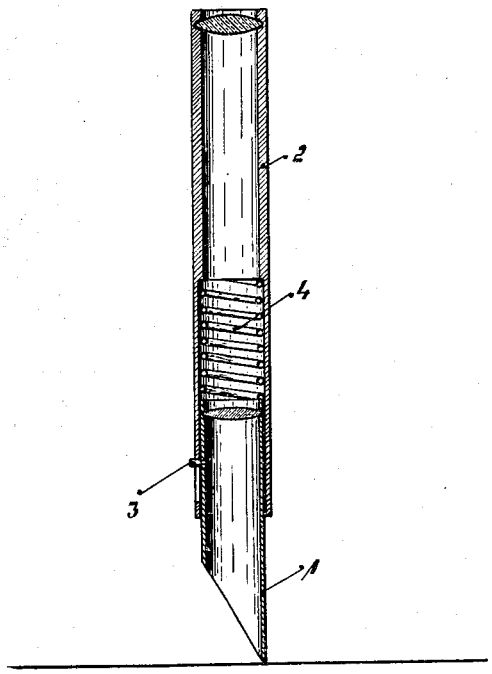
Inventor:
Karl Ahmels
Ludwig Ohm
by: Hans Heiderich, P.D.
Attorney Patented Apr. 22, 1930

1,755,759

UNITED STATES PATENT OFFICE

KARL AHMELS, OF KASSEL, AND LUDWIG OHM, OF GUDENSBERG, NEAR KASSEL, GERMANY

POCKET MICROSCOPE

Application filed June 30, 1928. Serial No. 289,455.

This invention relates to pocket-microscopes and consists in shaping a tube of the microscope by obliquely cutting it off near the focus of the objective-lens in such a manner, that the light may arrive at the object of the observation without obstacle.

Said tube may be the tubes of the microscope containing the ocular or is preferably a sleeve, inserted in the ocular-tube and containing the objective-lens.

The invention is more fully described and claimed hereinafter and shown in the accompanying drawing, which represents the new pocket-microscope in cross-section.

The microscope consists of the ocular-tube 2 and the sleeve 1, which is inserted in said tube. Said sleeve contains the objective-lens and is obliquely cut off at its lowermost end. In this way the light can fall without obstacle onto the object to be observed. The point of the sleeve 1 may be set up next to said object. A pin 3 is fastened to the sleeve 1. This pin 3 passes through a slit of the ocular-tube. Thus the microscope may be exactly regulated by shifting the sleeve 1 in the tube 2. A spring 4 may be inserted between the sleeve 1 and the tube 2 in such a manner, that the regulating may be effected by simply pressing down the ocular tube 2, against the point of sleeve 1.

The described pocket-microscope is ever ready for purposes of observation.

The exact sizes, proportions and so on are not essential to the successful operation of said pocket-microscope and we do not therefore limit ourselves to the precise details of construction save in so far as are hereinafter claimed.

We claim:

1. A pocket microscope, comprising, in combination, an ocular tube and an ocular lens in it; an objective tube and an objective lens in it, this tube being shiftable in the ocular tube, and cut-off obliquely at its lower end so as to form there a point of support and permit free access of light to the object to be observed, substantially as set forth.

2. A pocket microscope, comprising, in combination an ocular tube and an ocular lens in the top thereof; an objective tube and an objective lens in the top thereof, this tube being shiftable in the ocular tube, and cut-off obliquely at its lower end so as to terminate in a point, substantially and for the purpose set forth.

3. A pocket microscope, comprising, in combination, an ocular tube and an ocular lens in it; and objective sleeve inserted into the lower end of said tube; an objective lens in said sleeve; a helical spring inserted into the said tube immediately above said sleeve, this latter being cut-off obliquely at its lower end so as to terminate in a point adapted to serve as supporting point for the microscope when observing an object, substantially as set forth.

In testimony whereof we affix our signatures.

KARL AHMELS.
LUDWIG OHM.